Jan. 10, 1928.
A. FOLTIS
1,656,110
PHOTO ELECTRIC SIGN
Filed Jan. 12, 1927    2 Sheets-Sheet 1
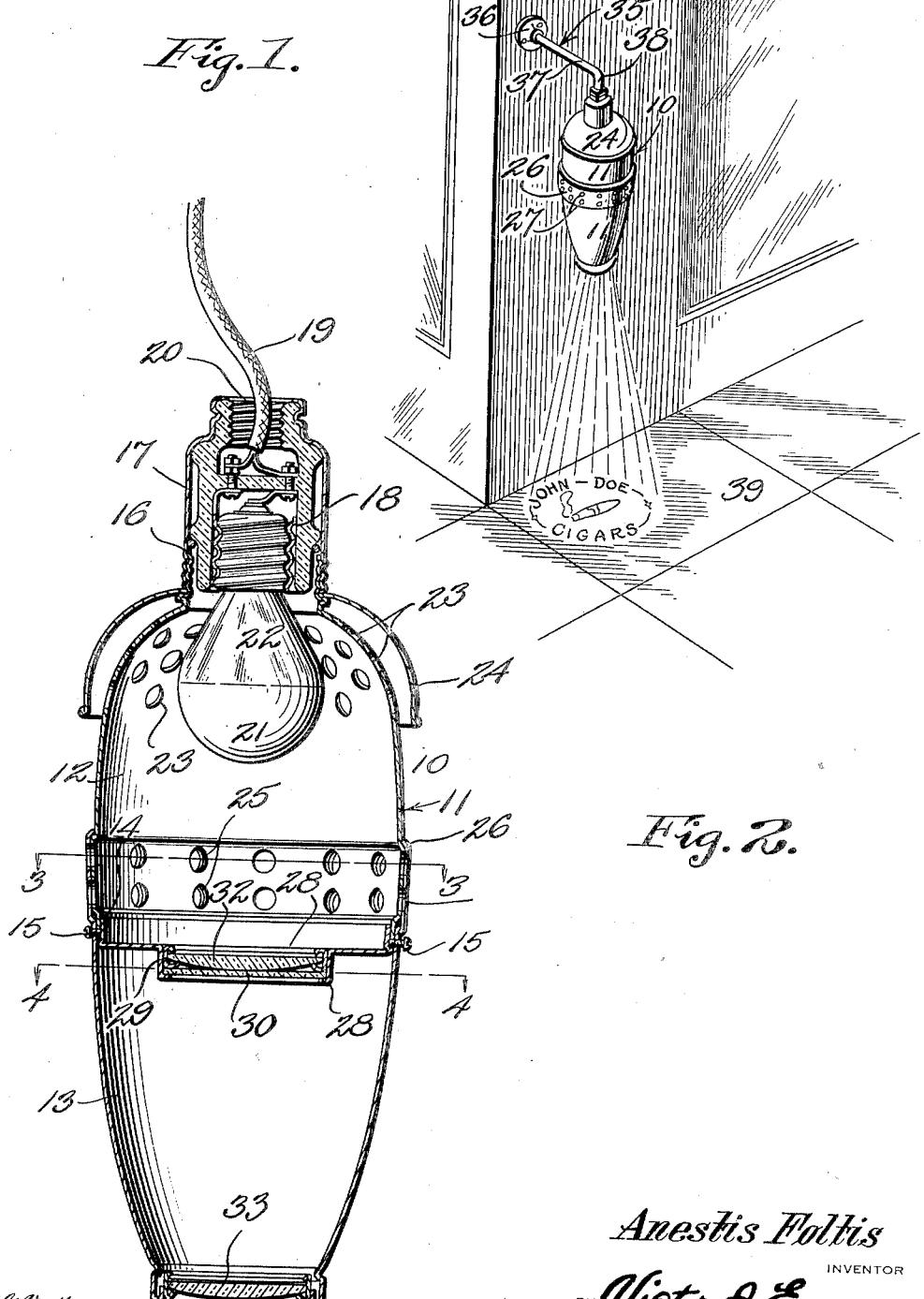

Jan. 10, 1928.

A. FOLTIS 1,656,110

PHOTO ELECTRIC SIGN

Filed Jan. 12, 1927

Anestis Foltis
INVENTOR
BY Victor J. Evans
ATTORNEY

Patented Jan. 10, 1928.

1,656,110

UNITED STATES PATENT OFFICE.

ANESTIS FOLTIS, OF ELMHURST, NEW YORK.

PHOTO-ELECTRIC SIGN.

Application filed January 12, 1927. Serial No. 160,682.

This invention relates to improvements in photo-electric signs and has particular reference to a projector for throwing an image upon a flat surface or screen for advertising purposes.

The primary object of the invention resides in a projector which may be mounted outside of a store or shop for reflecting an image upon the sidewalk or wall of a building to attract the attention of the passers-by, and which image may be advertising indicia pertinent to the goods or services sold within the store.

Another object of the invention is the provision of a projector in which the lenses are fixedly mounted with respect to the image plate so that it is unnecessary to adjust the focus of the lenses to produce a clear and distinctive image.

Another object of the invention is to provide a projector which may be exposed to the elements and not effect thereby as it will be appreciated that the style of projectors now on the market could not be used and left in the open.

A still further object of the invention is the provision of a projector in which the usual reflector is eliminated and which is constructed to provide a relatively small and compact device.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a perspective view of my improved projector in use.

Figure 2 is an enlarged vertical sectional view therethrough.

Figure 3:
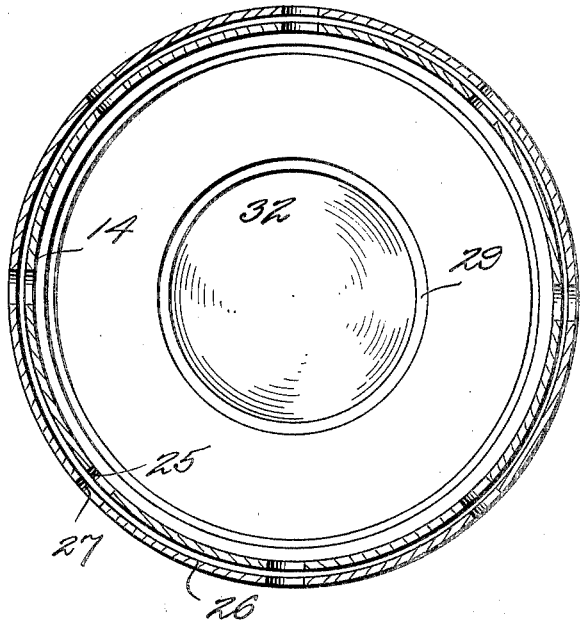
Figure 3 is a horizontal sectional view on the line 3—3 of Figure 2.
Figure 4:
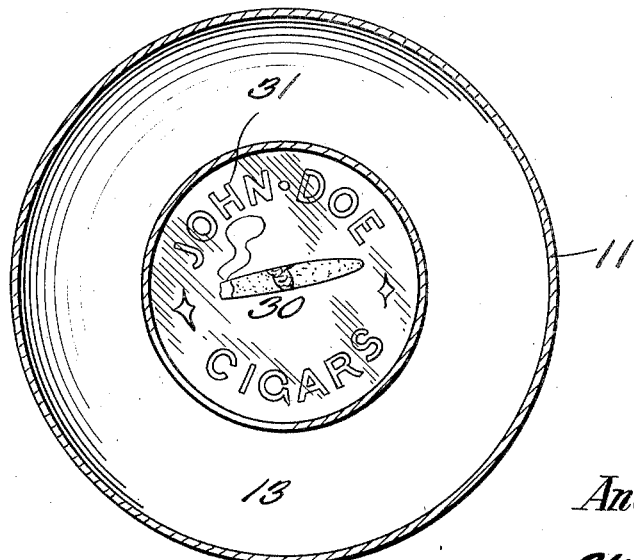
Figure 4 is a similar sectional view on the line 4—4 of Figure 2.

Refering more particularly to the drawing, the reference numeral 10 designates my improved projector in its entirety, which includes a pear shaped housing 11 composed of a pair of co-acting shell sections 12 and 13, the section 12 having one of its open ends reduced to provide a flange 14 which is telescoped by one of the ends of the section 13. The sections 12 and 13 are detachably connected together by set screws 15 which are carried by the section 13 and engage the flange 14. The section 12 has a threaded extension 16 provided thereon for threadedly receiving a cap 17 within which an electric light socket 18 is provided and through the base of which the usual electric wires 19 lead from any suitable source of supply. The outer end of the cap is internally screw threaded as at 20 for a purpose to be presently explained.

An electric light lamp 21 is screwed into the socket 18 to make contact with the wires 19 and which is of an exceptionally high power to produce a strong and brilliant light. The lamp is provided with a silvered portion 22 for reflecting the rays of light in an outward direction. The electric lamp is housed within the shell section 12 and which section as well as the section 13 is constructed of a highly polished and relatively light metal such as aluminum.

The shell section 12 is provided with air openings 23 to permit of the escape of heat therefrom and for allowing the cooled air to enter as it will be appreciated that an electric lamp of this type produces an intense heat. The openings 23 are protected from rain and snow by a hood or shield 24 which is clamped down over the shell section 12 by the cap 17. Openings 25 are also provided in the shell section 12 adjacent the flange 14 and which openings are shielded from the elements by a spaced baffle ring 26 having openings 27 therein disposed out of register with the openings 25. It will be seen that the openings 23 and 25 co-act to create a draft through the shell section 12 to maintain the same in a relatively cool condition.

Fitting within the inner end of the section 12 and frictionally supported by the walls thereof is a lens holder or partition 28 having an annular casing 29 extended therefrom and which supports an image plate 30 having suitable indicia 31 thereon and which may be in the form of an advertising. A lens 32 is supported by the walls of the casing 29 adjacent the image plate 30 so as to be disposed intermediate the electric lamp 21 and the said image plate.

The outer end of the shell section 13 is open and supports a second lens 33 disposed in axial alignment with the lamp 21, lens 32 and image plate 30. It is desired to call attention to the fact that both of the lens and the image plate are stationarily mounted with respect to each other and to the source of light, and the relative closeness of the said parts permits the construction of a projector of a relatively small size. The entire length of a working model of the device does not exceed ten inches which makes it practical and inconspicuous when mounted for use in the open.

For supporting the device in operating position, I employ various means to meet the conditions but one particular means has been shown in the drawings and which includes a portable stand 35 comprising a base 36 from which a tubular shaped pipe or standard 37 rises. The top end of the pipe is bent over into a goose neck to provide a downwardly extending leg 38 which is screw threaded for co-action with the threads 30 on the cap 17, whereby the projector is supported in spaced relation to a screen or other surface onto which the image may be projected. In the present instance, a sidewalk 39 may be considered a screen for receiving the projected image. By the use of a lamp mounted behind a pair of spaced lenses having an image plate interposed therebetween, the image upon the plate is thrown from the projector onto a spaced screen or other flat surface. With this particular projection it is not necessary to adjust any of the lenses or the lamps in order to produce a clear and brilliant image. However, the size of the image as projected depends upon the distance between the projector and the screen. The closer the projector is to the screen, the smaller will be the projected image, while the greater the distance the larger will be the image.

My projector is primarily intended for advertising purposes and for use outside of stores or shops for attracting the attention of passers-by. If desired, a blinker button may be inserted at the bottom of the electric light socket 18 before inserting the electric lamp to cause an intermittent lighting of the said lamp so that the image is flashed on and off the screen.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claim.

What is claimed as new is:—

A photo-electric sign comprising a casing having air openings provided therein, a cap threaded to one end of said casing, an electric lamp socket mounted in said cap, a shield fitted over said casing for covering said openings and held thereon by said cap, a pair of spaced lenses mounted in said casing, and an image plate interposed between said lenses and disposed closer to one of said lenses than to the other.

In testimony whereof I have affixed my signature.

ANESTIS FOLTIS.